United States Patent
Aepli

[11] Patent Number: 5,804,125
[45] Date of Patent: Sep. 8, 1998

[54] PROCESS FOR PRODUCING FERRULES BY INJECTION MOLDING POLYMERS WHILE ROTATING A MOLD PART

[75] Inventor: Etienne Aepli, Speicherschwendi, Switzerland

[73] Assignee: Huber & Suhner AG, Herisau, Switzerland

[21] Appl. No.: 644,724

[22] Filed: May 10, 1996

Related U.S. Application Data

[63] Continuation-in-part of Ser. No. 351,121, Nov. 30, 1994, abandoned.

[30] Foreign Application Priority Data

Dec. 17, 1993 [CH] Switzerland .............................. 3778/93

[51] Int. Cl.$^6$ ....................................................... B29C 45/26
[52] U.S. Cl. .................... 264/310; 264/312; 264/328.11; 264/328.12
[58] Field of Search .............................. 264/312, 328.12, 264/108, 310, 328.11

[56] References Cited

U.S. PATENT DOCUMENTS

| | | | |
|---|---|---|---|
| 3,222,439 | 12/1965 | Bolomey et al. | 264/312 |
| 3,307,726 | 3/1967 | Cleereman | 264/312 |
| 3,356,242 | 12/1967 | Cleereman | 264/328.12 |
| 3,468,997 | 9/1969 | Pickels | 264/312 |
| 3,487,140 | 12/1969 | Laux et al. | 264/312 |
| 3,907,952 | 9/1975 | Cleereman | 264/312 |
| 4,277,435 | 7/1981 | Allen | 264/328.12 |
| 4,783,301 | 11/1988 | Hong | 264/312 |
| 5,244,378 | 9/1993 | Bross et al. | 264/328.12 |
| 5,374,183 | 12/1994 | Takeuchi | 264/328.12 |

FOREIGN PATENT DOCUMENTS 58-163616 9/1983 Japan ...................................... 264/312

*Primary Examiner*—Jill L. Heitbrink
*Attorney, Agent, or Firm*—Jay H. Maioli

[57] ABSTRACT

Flow lines are eliminated from workpieces injection-molded from liquid crystal polymers, fiber-filled or mineral-filled thermoplastics by selecting a liquified polymer having a linear coefficient of thermal expansion less than $(2-6) \times 10^{-6}/°K$, providing a flow path in a mold for the polymer in two directions around a core in the mold, and subjecting the polymer to a shearing energy only simultaneously with mold filling over at least part of the flow path, whereby molecules of the polymer are disoriented and fail to produce a rigid alignment.

3 Claims, 1 Drawing Sheet

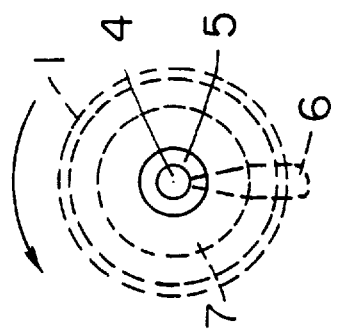
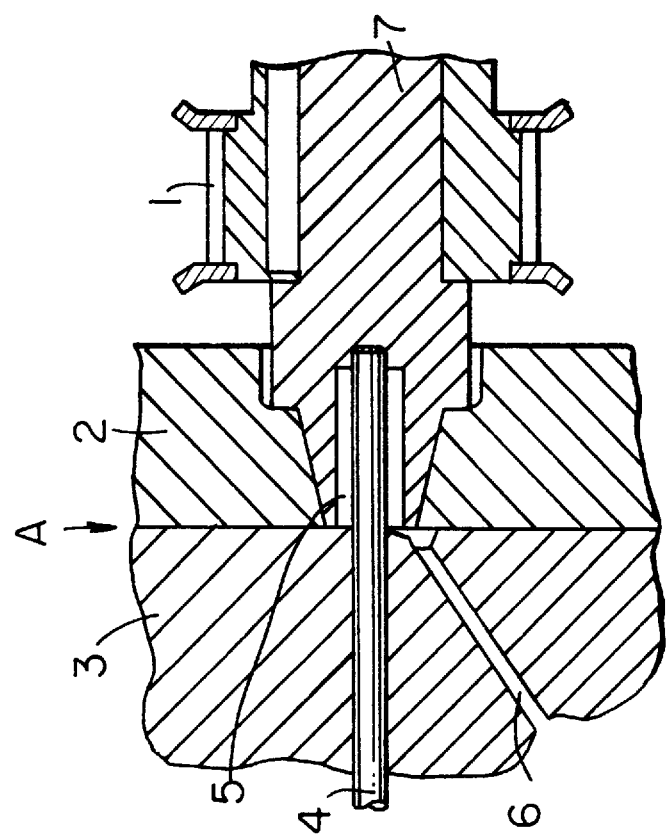

PROCESS FOR PRODUCING FERRULES BY INJECTION MOLDING POLYMERS WHILE ROTATING A MOLD PART

CROSS REFERENCE TO RELATED APPLICATION

This invention is a continuation-in-part of our U.S. application Ser. No. 08/351,121, filed Nov. 30, 1994, now abandoned, and entitled PROCESS FOR THE PROCESSING OF THERMOPLASTIC POLYMERS BY MEANS OF THE INJECTION-MOLDING TECHNIQUE, the contents of which are incorporated herein by reference.

BACKGROUND OF THE INVENTION

The present invention relates generally to a process for the processing of thermoplastic polymers, such as liquid crystal polymers, fiber-filled thermoplastics or mineral-filled thermoplastics by means of the injection-molding technique, to prevent a flow line in the production of workpieces and particularly, to the manufacture of sleeves and ferrules for use in fiber optic applications, specifically in fiber optic connectors.

Both metals and resins have been used in fiber optic connector applications. Metal is comparatively expensive and suffers from abrasion and corrosion in the form of oxides in powder form, thus creating the danger that the powder may contaminate other parts and form unwanted chemical compounds, even electrical isolators or dielectrics.

In an attempt to circumvent the problem of corrosion, thermoplastic resins have been used. However, it is often difficult to achieve the proper homogeneity required in order to have the proper coefficient of linear expansion that is required.

Persons working in the field have tried admixing glass and/ or ceramics to various thermoplastic resins or polymers. Unfortunately, however, this causes abrasion wear at the mold parts. This abrasion can be minimized by using liquid crystalline polymers that orient themselves in two different directions within the polymer matrix. For use in fiber optics applications, the orientation required must be longitudinal, that is, in the direction of the cable and not transversal in orientation.

Liquid crystal polymers, known as LCPs for short, and also fiber-filled or mineral-filled thermoplastics have a highly oriented morphological structure as a characteristic feature.

To simplify the description for the thermoplastics mentioned at the beginning, the case of LCPs is described below as representative of all the other thermoplastics, such as fiber-filled or mineral-filled thermoplastics.

LCPs are composed of rigid, rod-shaped macromolecules, which become parallel to one another in the melt and generate liquid-crystalline structures. If a liquid crystal polymer melt is subjected to a shearing or stretching flow, as is the case with extruder screws, the macromolecules become ordered into fibers and fibrils and produce the specific morphology in the solid state.

The properties that are influenced by the high orientation in the polymer melt exhibit a pronounced anisotropy. In the direction of orientation, strength and rigidity are significantly higher than transversely thereto and the coefficient of thermal expansion is significantly higher perpendicularly to the orientation than parallel thereto.

Disadvantageous are the so-called weld or flow lines on each workpiece made of such reinforced plastics, since they constitute a weak point in the workpieces. In the case of liquid crystal polymers, on the one hand the rigid molecule chains and on the other hand possibly present fibrous reinforcing materials, are aligned substantially parallel to the flow line, as a result of which the direction-dependant physical properties are absent or greatly reduced in the region of the weld or flow line.

A distinction is drawn between two types of flow lines. First, there are so-called butt flow lines that are produced if two melt streams flow against each other, the melt fronts meeting each other perpendicularly to the direction of flow. The molecules are oriented parallel to the melt front and therefore cannot unite. Second, there are flow lines that are produced by the two part-streams separated by an obstacle after flowing around the obstacle and uniting again behind the obstacle in the direction of flow.

In keeping with these findings, it is generally endeavored to produce workpieces that do not produce any flow line. Manufacturers of the raw materials therefore advise that unavoidable flow lines should be positioned in regions of lower stresses. However, in the case of hollow-cylindrical workpieces this is scarcely possible in practice and the sleeves thus formed have much poorer physical properties diametrically than axially.

Skilled artisans have attempted to solve this problem by rotating the mold. It is generally accepted by those skilled in the art that this rotation must necessarily be done after the mold has been filled. It is generally accepted that failure to rotate the mold during the period after the mold is filled causes failure of molecular orientation. It is accordingly an object of the invention to provide a process of preventing flow lines from occurring at all.

OBJECTS AND SUMMARY OF THE INVENTION

The inventor herein has unexpectedly discovered that superior molecular orientation can indeed be achieved without rotation of the mold after the mold is filled. The inventor has unexpectedly discovered that molecular orientation can be achieved by subjecting the polymer to shearing energy only once, during mold filling, thereby eliminating and reducing flow lines. More particularly, the inventor has unexpectedly discovered that rotation of at least one part of the mold while the mold is being filled exerts a tangential force on the material, herein referred to as "shearing stress", such that flow lines are eliminated in the final article.

According to one aspect of the invention, this is achieved by selecting a liquified polymer having a linear coefficient of thermal expansion between $6 \times 10^{-6}/°K$ and $2 \times 10^{-6}/°K$, providing a flow path in a mold for the polymer in two directions around a core in the mold; and subjecting the liquefied polymer having a flow path in two directions around a core in a mold to a shearing energy only simultaneously with mold filling, over at least part of the flow path, whereby molecules of the polymer are disoriented and fail to produce a rigid alignment, thereby avoiding or at least reducing flow lines in producing injection molded workpieces.

Application examples of the invention are explained below. An application of the inventive process is also explained in more detail with reference to the drawings.

BRIEF DESCRIPTION OF THE DRAWINGS

FIG. 1 shows a sectional view of an injection mold for producing a cylindrical hollow body, and FIG. 2 shows a sectional view of the injection mold according to the line of intersection A in FIG. 1.

DETAILED DESCRIPTION OF PREFERRED EMBODIMENTS

It is presumed that the formation of flow or weld lines is produced by shearing and stretching forces produced by the wall of the mold to be filled, because the wall is cooled and therefore a stratification of the outer layers towards the wall interior is obtained. With a single sprue, consequently there inevitably occur in the case of workpieces in the form of hollow bodies, such as are used for example in connectors used in optical waveguide technology, two circulating melt streams and consequently a weld line is formed which weakens the body and is intensified further by the unavoidable stratification at the outer wall parts.

Prevention of these undesired effects would thus eliminate the problem of weld and flow lines. It has been established that a reduction in the alignment of the molecules is brought about by additional shearing energy, as is produced for example in the pressure generator by the rotating screw. According to the invention, this finding is then applied to the side of the mold. A rotating location which produces the additional shearing energy is created there.

In a fiber optic connector, the tolerance field is a maximum of 0.005 mm and the glass fiber should not move within the connector with temperature changes. Thus, the linear coefficient of thermal expansion for the connector material between $6\times10^{-6}/°K$ and $2\times10^{-6}/°K$.

In the case of a workpiece that is injection-molded with an obstacle behind which a flow line forms, according to this finding the flow line can be prevented, at least at the weakest point, directly behind the obstacle, if the obstacle is rotated only while filling the mold. Since no weld line is produced at the beginning, it will at least also not be so pronounced subsequently as is the case with a stationary obstacle.

In the case of workpieces in the form of sleeves, at least one mold part, either the outer part or the inner part, may be rotated during filling. As a result, on the one hand the flow of the melt part-stream is intensified in the direction of rotation and, on the other hand diminished in the opposite direction. Consequently, the molecules are disoriented and no longer produce a rigid alignment, as a natural result of which the weld line is at least diminished, if it does not disappear completely.

FIG. 1 and FIG. 2 show an injection-molding installation in a greatly simplified form. The injection mold comprises a fixed platen 3 with a runner 6 and an axially movable platen 2. A pin or inner mold part 4, located in the fixed platen, forms the core in a cavity 5, formed by an outer mold part 7 of the movable platen 2. The mold part 7 is connected to a drive shaft 1, permitting a rotation of this mold part 7.

The two platens 2, 3 are cooled in order that the liquified injection material, plasticated by heat, solidifies again. Consequently, the mold part 7 can be rotated by the drive shaft 1 and, as a result, shearing energy is applied to the material injected into the cavity, so that no weld line can form any longer.

The above description is presented by way of example only and it will be apparent that many modifications and variations could be effected by one skilled in the art.

Instead of the mold part 7, the pin 4 could also be rotated to produce the same effect. By production in the way described, sleeves of very thin wall thickness of just a few tenths of a millimeter exhibit virtually the same mechanical resistance with respect to axial and radial pressing forces and in no case could a weld or flow line be found any longer.

I claim:

1. A process for producing thin walled ferrules by injection-molding a liquefied thermoplastic polymer having rigid rod-shaped molecules into a mold having a rotatable cylindrical center core, including the steps of:

selecting a thermoplastic polymer from a class consisting of liquid crystal polymers, fiber-filled or mineral-filled thermoplastics, the liquified polymer having a linear coefficient of thermal expansion between $6\times10^{-6}/°K$ and $2\times10^{-6}/°K$;

injecting said selected polymer into said mold in a direction generally perpendicularly toward said cylindrical center core and forming a flow path in said mold for said selected polymer in two directions around said cylindrical center core;

rotating one of said mold or said cylindrical center core only simultaneously with said step of injecting and without rotation after the mold is filled and producing a tangential force on said selected polymer disorienting said rigid rod-shaped molecules, thereby preventing flow lines; and cooling said mold, thereby producing a ferrule having a linear coefficient of thermal expansion between $6\times10^{-6}/°K$ and $2\times10^{-6}/°K$.

2. Process according to claim 1, characterized in that for ferrules having two bounding surfaces whose dimensions in length and width are greater than their distance from each other, the tangential force is brought about by rotating the core inside the mold in the polymer flow path.

3. Process according to claim 1, characterized in that said mold is rotated.

* * * * *